US010216979B2

(12) United States Patent
Magai et al.

(10) Patent No.: US 10,216,979 B2
(45) Date of Patent: Feb. 26, 2019

(54) IMAGE PROCESSING APPARATUS, IMAGE PROCESSING METHOD, AND STORAGE MEDIUM TO DETECT PARTS OF AN OBJECT

(71) Applicant: CANON KABUSHIKI KAISHA, Tokyo (JP)

(72) Inventors: Koichi Magai, Tokyo (JP); Masakazu Matsugu, Yokohama (JP); Masato Aoba, Tokyo (JP); Yasuo Katano, Kawasaki (JP); Takayuki Saruta, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 15/194,304

(22) Filed: Jun. 27, 2016

(65) Prior Publication Data

US 2017/0011523 A1    Jan. 12, 2017

(30) Foreign Application Priority Data

Jul. 6, 2015    (JP) ................................. 2015-135680

(51) Int. Cl.
| G06K 9/00 | (2006.01) |
| G06K 9/62 | (2006.01) |
| G06K 9/46 | (2006.01) |

(52) U.S. Cl.
CPC ......... *G06K 9/00248* (2013.01); *G06K 9/468* (2013.01); *G06K 9/6256* (2013.01); *G06K 9/6262* (2013.01)

(58) Field of Classification Search
None
See application file for complete search history.

(56) References Cited

U.S. PATENT DOCUMENTS

| 7,916,917 | B2 * | 3/2011 | Dewaele et al. | 382/128 |
| 8,165,359 | B2 * | 4/2012 | Dewaele et al. | 382/128 |
| 9,955,140 | B2 * | 4/2018 | Rhemann et al. | |

(Continued)

FOREIGN PATENT DOCUMENTS

JP    2009-151445 A    7/2009

OTHER PUBLICATIONS

Pedro Felzenszwalb, et al.—A Discriminatively Trained, Multiscale, Deformable Part Model; IEEE Conference on Computer Vision and Pattern Recognition (CVPR).

(Continued)

*Primary Examiner* — Tahmina N Ansari
(74) *Attorney, Agent, or Firm* — Canon U.S.A., Inc. IP Division

(57) ABSTRACT

An image processing apparatus includes an acquisition unit, a first detection unit, a selection unit, and a correction unit. The acquisition unit acquires an image including a target object having a plurality of parts. The first detection unit detects a candidate region of each of the plurality of parts of the target object included in the acquired image using a previously learned model. The selection unit selects, based on the candidate region detected by the first detection unit, a first part having relatively high reliability and a second part having relatively low reliability from among the plurality of parts. The correction unit corrects the model by changing a position of the second part based on the first part selected by the selection unit.

20 Claims, 8 Drawing Sheets

(56) References Cited

U.S. PATENT DOCUMENTS

2015/0086108 A1* 3/2015 Craig et al. .................. 382/154
2017/0011523 A1* 1/2017 Magai et al.
2017/0213080 A1* 7/2017 Nathan .............. G06K 9/00369

OTHER PUBLICATIONS

Navneet Dalal, et al—Histograms of Oriented Gradients for Human Detection; In CVPR, University of Caliornia, Irvine.
Yi Yang, et al.—Articulated pose estimation with flexible mixtures-of-parts; IEEE Conference on Computer Vision and Pattern Recognition (CVPR), Montbonnot, France.
Radhakrishna Achanta, et al.—SLIC Superpixels Compared to State-of-the-Art Superpixel Methods; CVPR, vol. 1, pp. 511-518; Nov. 2012.
Paul Viola, et al.—Rapid object detection using a boosted cascade of simple features; CVPR, vol. 1, pp. 511-518, May 2004.

* cited by examiner

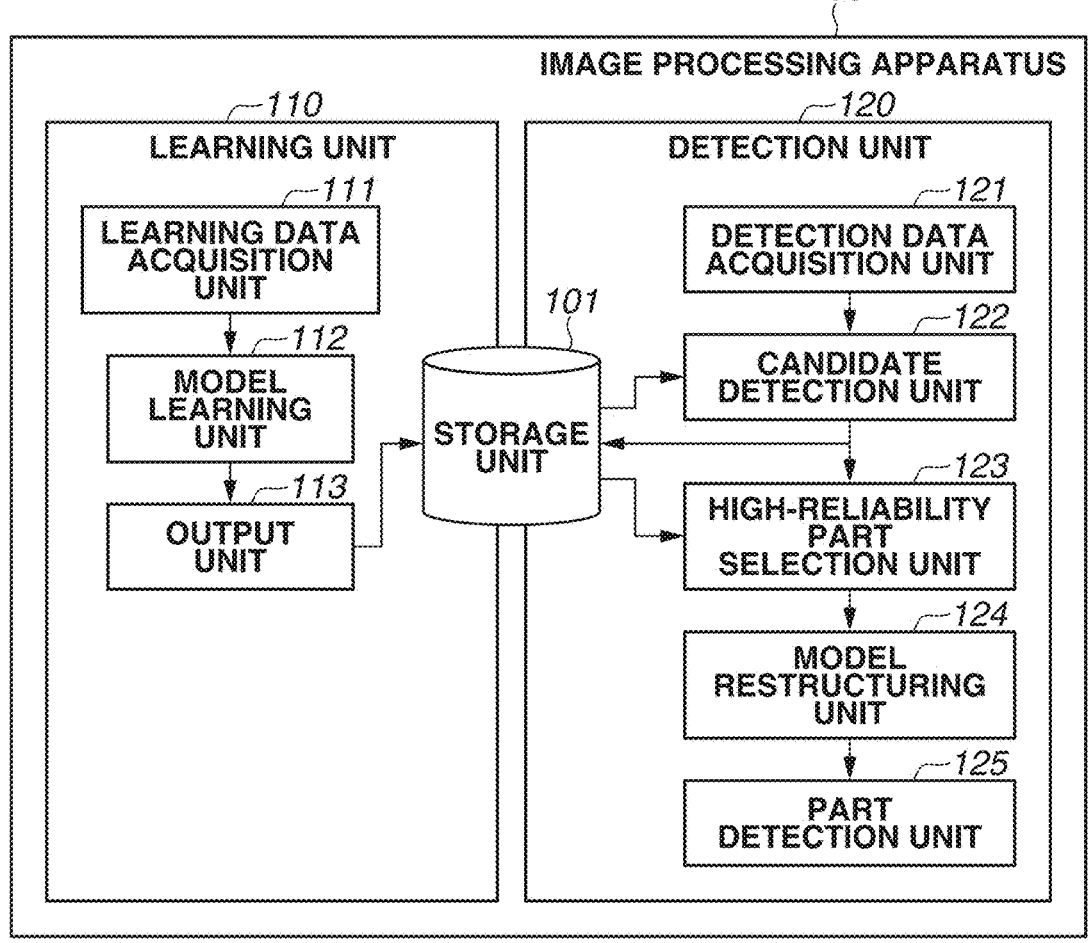
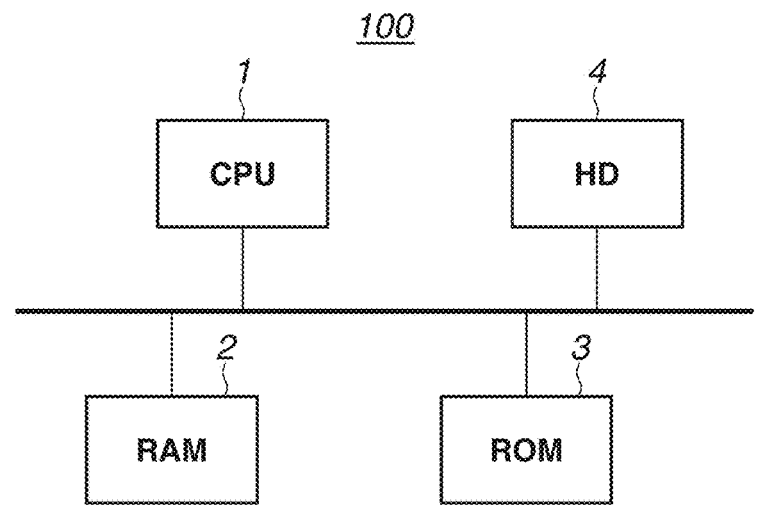

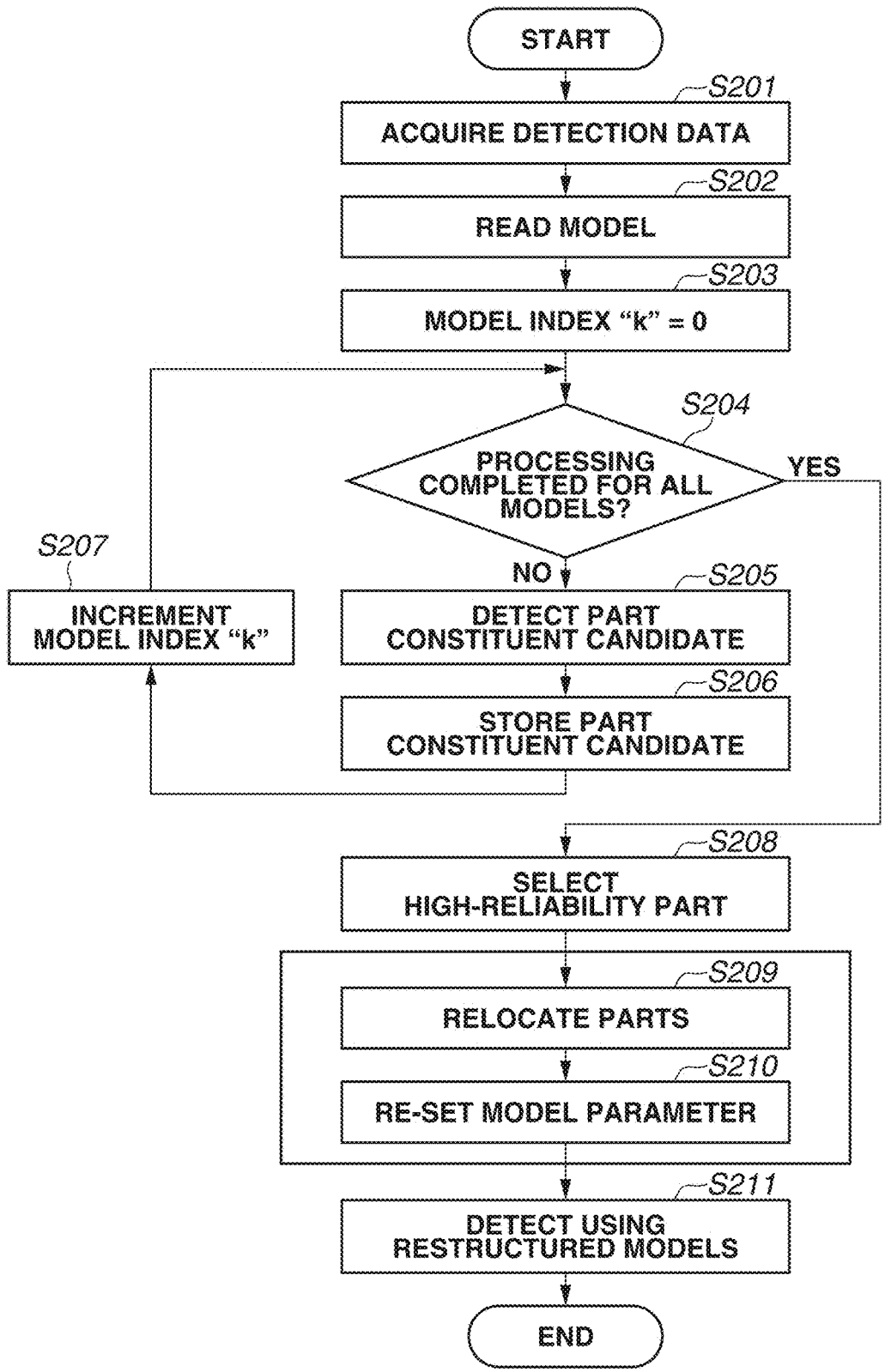

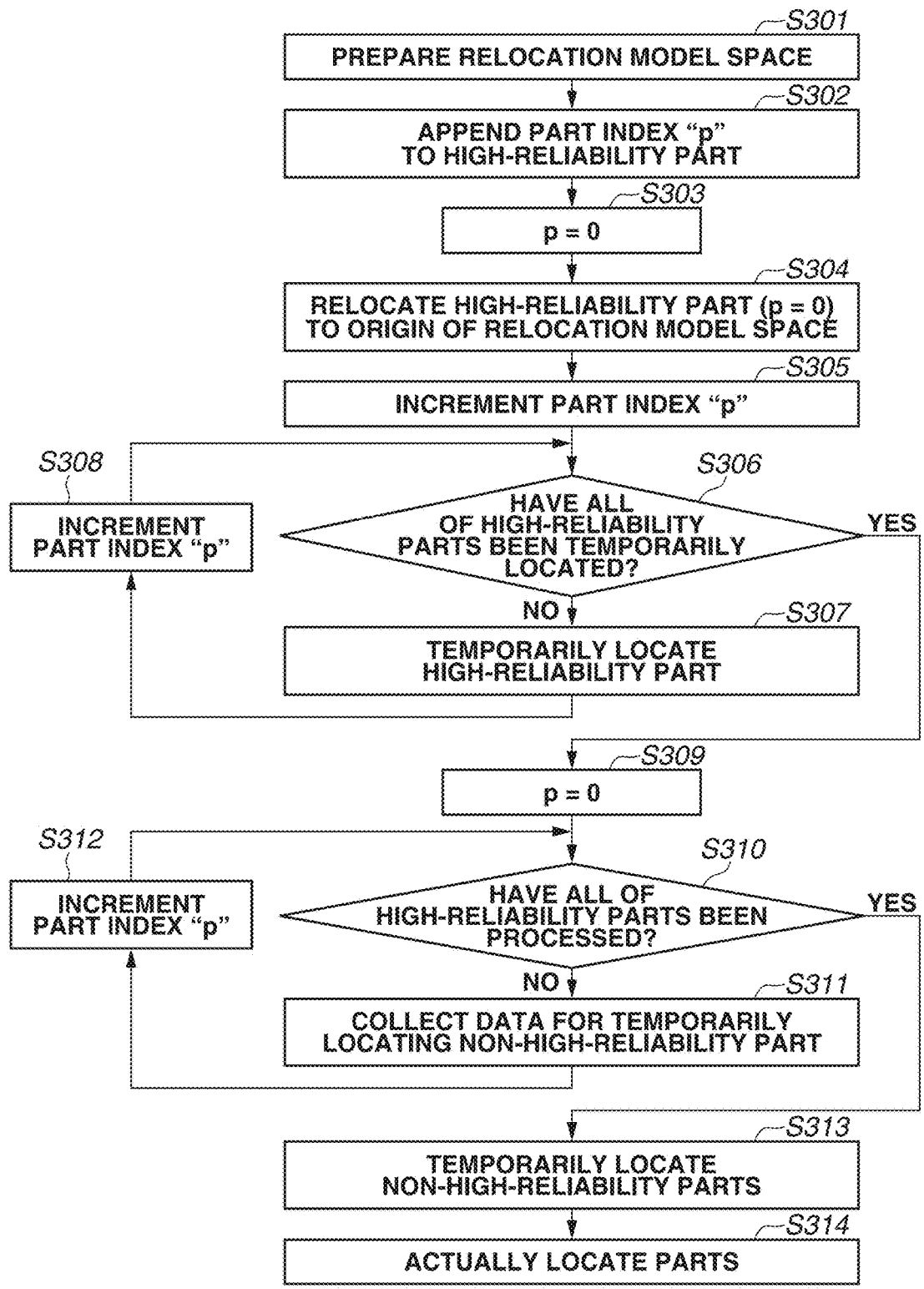

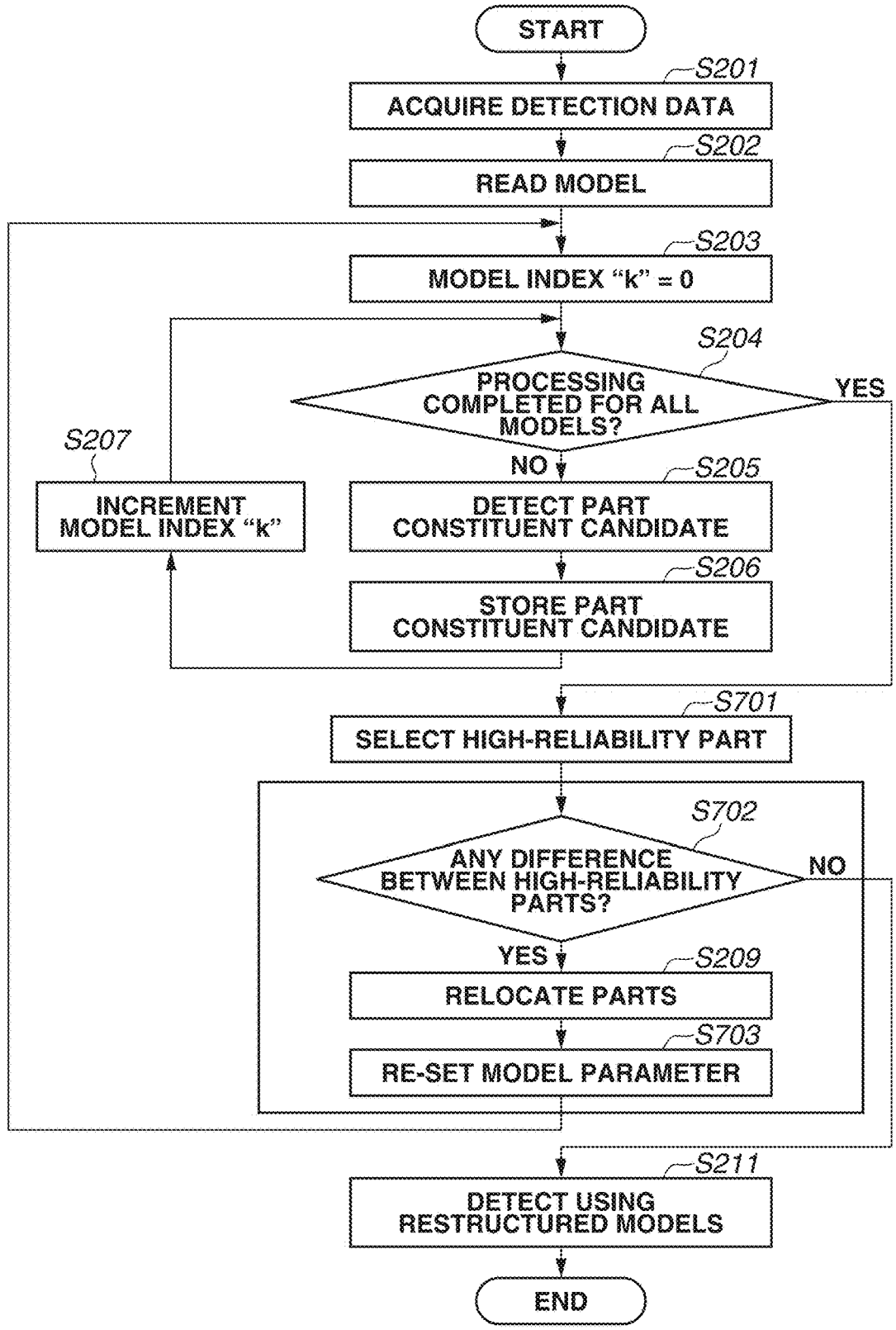

IMAGE PROCESSING APPARATUS, IMAGE PROCESSING METHOD, AND STORAGE MEDIUM TO DETECT PARTS OF AN OBJECT

BACKGROUND OF THE INVENTION

Field of the Invention

Aspects of the present invention generally relate to a technique to detect the position of each part (component) of a target object in an image.

Description of the Related Art

Non-patent literature 1 (P. Felzenszwalb, D. McAllester, D. Ramanan, "A Discriminatively Trained, Multiscale, Deformable Part Model", IEEE Conference on Computer Vision and Pattern Recognition (CVPR), 2008) discusses the detection of an object and also discusses a deformable part model used for estimating the attitude of the object. In the technique discussed in non-patent literature 1, one object is represented by a combination of tree models, and a node of each tree corresponds to a thing (a part model) obtained by modeling a partial area (region) of the object and an attitude of the region (a partial attitude). Since each part model is allowed to vary in position within a previously determined range during the detection of the object and each partial attitude also becomes definite during the object detection, the estimation of the attitude of the object would be performed at the same time. Hereinafter, such a model is referred to also as a "deformable part model".

Japanese Patent Application Laid-Open No. 2009-151445 discusses a technique to use a deformable part model. To reduce influences of a change in an object on the feature amount of an image, the technique discussed in Japanese Patent Application Laid-Open No. 2009-151445 selects and uses "a partial region with no change" that exists in learned images in common. That technique selects such a partial region in the following steps at the time of learning. The steps include (1) generating a gradient image from each normalized learned image, (2) generating a gradient average image as an average image of gradient images, and (3) selecting a partial region the center of which is a pixel having a maximum pixel value in the gradient average image.

The technique discussed in Japanese Patent Application Laid-Open No. 2009-151445 is effective for an object the shape of which is fixed to some extent and which has no large change in relative position or direction of the partial region, such as a pedestrian shot by a car-mounted camera. However, that technique cannot sufficiently deal with an object which has a large change in overall shape between objects belonging to the same category or which is analogous in overall shape but has a change in relative position or direction of the partial region, such as a person who is performing various movements. This is because the relative position of a partial region, such as the extremities, readily changes due to some differences in partial attitude, so that a partial region available for detection cannot be sufficiently selected from the learned image. Thus, it is not so effective in practice.

SUMMARY OF THE INVENTION

Aspects of the present invention are generally directed to precisely detecting the position of each part of an object even in a case where a partial region cannot be sufficiently selected from a learned image.

According to an aspect of the present invention, an image processing apparatus includes an acquisition unit configured to acquire an image including a target object having a plurality of parts, a first detection unit configured to detect a candidate region of each of the plurality of parts of the target object included in the acquired image using a previously learned model, a selection unit configured to select, based on the candidate region detected by the first detection unit, a first part having relatively high reliability and a second part having relatively low reliability from among the plurality of parts, and a correction unit configured to correct the model by changing a position of the second part based on the first part selected by the selection unit.

Further features of the present invention will become apparent from the following description of exemplary embodiments with reference to the attached drawings.

BRIEF DESCRIPTION OF THE DRAWINGS

FIGS. 1A and 1B are schematic block diagrams illustrating an image processing apparatus according to a first exemplary embodiment.

FIG. 2 is a flowchart illustrating detection processing for an object according to the first exemplary embodiment.

FIG. 3 is a flowchart illustrating relocation processing for parts according to the first exemplary embodiment.

FIG. 7 is a flowchart illustrating detection processing for an object according to a fourth exemplary embodiment.

DESCRIPTION OF THE EMBODIMENTS

Figure 4:
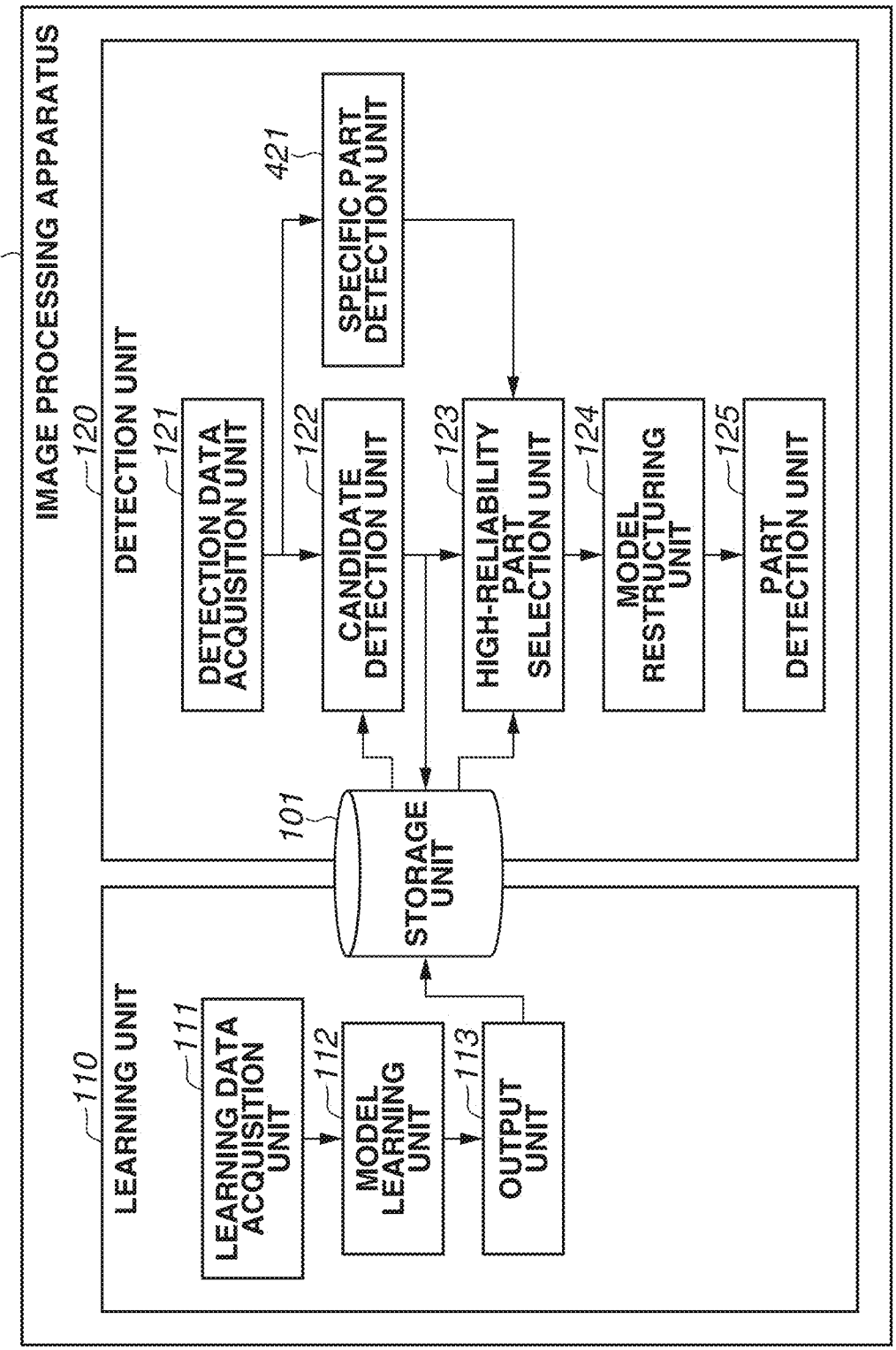
FIG. 4 is a schematic diagram illustrating a functional configuration of an image processing apparatus according to a second exemplary embodiment.

First, a first exemplary embodiment of the present invention is described. In the present exemplary embodiment, in some cases, a target object may be referred to as an "object", a region that is a portion of the target object may be referred to as a "part", the positional relationship between regions of the target object may be referred to as an "attitude", and the overall attitude may be referred to as a "posture". Specific examples of a part include the head, torso, right and left upper arms (shoulder-elbow), right and left forearms and hands (elbow-fingers), right and left thighs (waist-knee), and right and left lower thighs and foots (knee-toes), as human body regions. Furthermore, although, in the present exemplary embodiment, a case is described in which an object serving as a detection target is the human body, the present invention is not limited by such a case. For example, the object can be a multijoint object which is composed of a plurality of regions connected by connection points, such as joints, and in which the regions exist in the same category in common, and thus does not have to be the human body. Furthermore, although, in the human body, each region exists between adjacent connection points, a region can exist at an area surrounding a connection point.

FIGS. 1A and 1B are schematic block diagrams illustrating an image processing apparatus 100 according to the first exemplary embodiment. In particular, FIG. 1A is a schematic block diagram illustrating a functional configuration of the image processing apparatus 100. Referring to FIG. 1A, the image processing apparatus 100 includes a storage unit 101, a learning unit 110, and a detection unit 120. The learning unit 110 includes a learning data acquisition unit 111, a model learning unit 112, and an output unit 113. Moreover, the detection unit 120 includes a detection data acquisition unit 121, a candidate detection unit 122, a high-reliability part selection unit 123, a model restructuring unit 124, and a part detection unit 125. The operation for object detection processing performed by the image processing apparatus 100 according to the present exemplary embodiment is divided into learning processing performed by the learning unit 110 and detection processing performed by the detection unit 120. The two processing operations do not have to be successively performed, and, as long as the learning processing has been once performed, the detection processing alone can be performed at any timing.

FIG. 1B is a schematic block diagram illustrating a hardware configuration of the image processing apparatus 100 according to the present exemplary embodiment. A central processing unit (CPU) 1 performs processing based on a program stored in a read-only memory (ROM) 3 or a hard disk (HD) 4. This implements functions of the image processing apparatus 100 and processing illustrated in the flowcharts, which are described later below. A random access memory (RAM) 2 stores data or information to be used for the CPU 1 to execute the program. The ROM 3 stores a boot program and other data to be loaded when the image processing apparatus 100 is activated. The HD 4 stores a program and other data to be executed in the present exemplary embodiment. Furthermore, although not illustrated for ease of description, the image processing apparatus 100 includes hardware associated with an interface used to perform communication with an external apparatus, such as an imaging apparatus (camera), and can receive an image captured by the camera and store the image on the HD 4.

Referring back to FIG. 1A, details of the respective functional units included in the learning unit 110 are described. The learning data acquisition unit 111 acquires, as learning data, learning images (a positive example image group and a negative example image group) and positive example region-of-interest information. The positive example image group is an image group including a plurality of images in each of which a human body (object) is imaged, and the negative example image group is an image group including a plurality of images in each of which no human body (object) is imaged. Moreover, the positive example region-of-interest information refers to information about an object serving as a detection target with respect to each positive example image, and is, in the present exemplary embodiment, part region information indicating each part region of a human body imaged in each positive example image.

Then, the model learning unit 112 generates and learns one or more models as models to be used for object detection. In the present exemplary embodiment, a model discussed in non-patent literature 1 mentioned above is used as a model that the model learning unit 112 generates. In the model discussed in non-patent literature 1, one object is represented by a combination of tree models, and a node of each tree corresponds to a thing (a part model) obtained by modeling a partial area (region) of the object and an attitude of the region (a partial attitude). Models that the model learning unit 112 generates in the present exemplary embodiment also include a root model and a part model, and the root model is obtained by modeling the entire object serving as a target object. The part model includes a plurality of rectangular regions, and is obtained by modeling each partial region of the object. The resolution at which to generate a part model is set to twice the resolution for a root model. The feature amount is defined using the feature of an edge structure, more specifically, using a Histogram of Oriented Gradient (HOG) feature extracted based on luminance gradients, which is discussed in non-patent literature 2 (N. Dalal, B. Triggs, "Histograms of Oriented Gradients for Human Detection", in CVPR, 2005). When detecting an object, the model learning unit 112 calculates a detection score for each part model and performs detection based on a total of detection scores. The calculation of scores is performed using a discriminant function expressed by the following formula (1):

$$\sum_{i=0}^{n} F_i \cdot \phi(H, p_i) + \sum_{i=1}^{n} \{a_i \cdot (x'_i, y'_i) + b_i \cdot (x'^2_i, y'^2_i)\} \qquad (1)$$

Here, the first term in formula (1) represents a score calculated from weight vectors $F_i$ of a root model and a part model obtained by learning and feature vectors $\phi(H, p_i)$ obtained from an image. In the following description, the weight vector $F_i$ of a root model or part model is referred to as a "root filter" or "part filter". The feature vector $\phi(H, p_i)$ is a vector obtained by connecting, in a scanning order, HOG features in a rectangular region within an image having a resolution corresponding to each model. Furthermore, in the following description, a rectangular region corresponding to a root model is referred to as a "root region", and a rectangular region corresponding to a part model is referred to as a "part region".

In the feature vector $\phi(H, p_i)$, "H" represents an HOG feature pyramid set forth in non-patent literature 2. "$p_i$", which is expressed by the following formula (2), represents a root rectangular region in the case of "i=0", and represents a part rectangular region in the case of "i>0". Additionally, "$l_i$" denotes an index indicating the hierarchy of the HOG feature pyramid "H", and "$(x_i, y_i)$" denotes the central coordinates on the index "$l_i$" of the part rectangular region "$p_i$".

$$p_i = (x_i, y_i, l_i) \qquad (2)$$

The second term in formula (1) corresponds to a cost function regarding the position variation of a part model. The cost function is defined based on a relative positional relationship of a part filter to a root filter. Here, "$a_i$" and "$b_i$" denote coefficients of the cost function obtained by learning. Moreover, "$x'_i$" and "$y'_i$" represent variations of the normalized relative position of a part region to a root region, and is defined by the following formula (3):

$$(x'_i, y'_i) = ((x_i, y_i) - 2(x, y) + v_i)/s_i \qquad (3)$$

Here, "(x, y)" represents the central coordinates of a root boundary rectangle, and "$v_i$" represents the relative positional relationship between the reference central coordinates of a root model and the reference central coordinates of a part model. The reference central coordinates, which are described later below, are determined as a hidden variable at the time of learning. Moreover, "$s_i$" denotes the size of a part region corresponding to the part rectangular region "$p_i$". Additionally, "2" in the second term of the numerator of the right-hand side is a coefficient for causing the coordinate scale of a root filter to accord with the coordinate scale of a part filter.

During learning of models, the model learning unit 112 obtains "β" and "z", which are used in the following formula (4), by which formula (1) is expressed:

$$\sum_{i=0}^{n} F_i \cdot \phi(H, p_i) + \sum_{i=1}^{n} \{a_i \cdot (x'_i, y'_i) + b_i \cdot (x'^2_i, y'^2_i)\} = \beta \cdot \psi(H, z) \quad (4)$$

wherein $$\beta = (F_0, \ldots, F_n, a_1, b_1, \ldots, a_n, b_n) \quad (5)$$

and $$\psi(H, z) = (\phi(H, p_0), \phi(H, p_1), \ldots, \phi(H, p_n), x'_1, y'_1, x'^2_1, y'^2_1, \ldots, x'_n, y'_n, x'^2_n, y'^2_n) \quad (6).$$

Here, "z" denotes a hidden variable representing the reference locations (reference central coordinates and reference scales) of a root model and a part model, which are simultaneously determined by learning, and is expressed by the following formula (7):

$$z = (p_0, \ldots, p_n) \quad (7)$$

Lastly, the models generated by the model learning unit 112 are passed to the output unit 113. Then, the output unit 113 stores the learned models into the storage unit 101. Thus far is the learning processing by the learning unit 110 according to the present exemplary embodiment.

Next, detection processing performed by the detection unit 120 to detect an object from an image serving as a detection target is described. FIG. 2 is a flowchart illustrating detection processing in the image processing apparatus 100 according to the present exemplary embodiment. Here, details of processing performed by each functional unit included in the detection unit 120 are described with reference to the flowchart of FIG. 2.

First, in step S201, the detection data acquisition unit 121 acquires a detection target image. Then, in step S202, the candidate detection unit 122 reads, from the storage unit 101, one or a plurality of models generated and learned by the learning unit 110. Then, in step S203, the candidate detection unit 122 initializes, to "0", a model index "k" used for discriminating a model read in step S202. Then, in step S204, the candidate detection unit 122 checks for the model index "k" and determines whether processing has been completed for all the models. If it is determined that processing has not yet been completed (NO in step S204), the processing proceeds to step S205. If it is determined that processing has been completed (YES in step S204), the processing proceeds to step S208.

In step S205, the candidate detection unit 122 calculates detection scores using the method set forth in non-patent literature 1 based on the model read in step S202, and detects a plurality of candidate regions (part constituent candidates) for the respective parts constituting the object. In this way, the candidate detection unit 122 according to the present exemplary embodiment functions as a first detection unit that detects candidate regions for parts of an object. Furthermore, in the present exemplary embodiment, when calculating a detection score, which indicates the degree of certainty of an intended part, the candidate detection unit 122 reads out an evaluation score calculator from the storage unit 101 and also takes a score calculated by the evaluation score calculator into consideration.

Here, the evaluation score calculator is described. In the present exemplary embodiment, since, to select a high-reliability part, a skin attribute is used as one of indices for evaluating the reliability of the part, a skin attribute discriminator, which is generated based on generative models for respective skin attributes, is used as a calculator for calculating a score regarding the skin attribute. In the present exemplary embodiment, the skin attribute is expressed as a combination of a skin type, a light source type, and a reflection intensity. Here, it is supposed that the skin type includes three types, i.e., Caucasian, African, and Asian, the light source includes four types, i.e., sunlight, fluorescent lamp, incandescent lamp, and light-emitting diode (LED), and the reflection intensity includes three types, i.e., shadeless, light shade, and dark shade. Thus, the skin attribute includes 36 types in total. The skin attribute discriminator generates a Gaussian distribution for each skin attribute by maximum likelihood estimation according to the following formula (8):

$$P_L(c) = N(\phi^L_c | \mu_c, \Sigma) \quad (8)$$

Here, "c" denotes a skin attribute index for discriminating a skin attribute, "$P_L(c)$" denotes a prior probability of the skin attribute "c", and "$\phi^L_c$" denotes a feature amount regarding a skin attribute assigned for each skin attribute "c", which is a vector composed of red, green, and blue (RGB) values. Moreover, "$\mu_c$" and "$\Sigma$" respectively denote an average and a variance-covariance matrix of the skin attribute feature amount (vector composed of RGB values). Then, the evaluation score in the present exemplary embodiment is expressed by the following formula (9):

$$\max_c \rho'_i(c) = \max_c \frac{1}{M} \sum_{j \in p_i}^{M} \{P_L(\phi'^L_{ij} | c) P_L(c)\} \quad (9)$$

Here, "c" denotes a skin attribute index, "$p_i$" denotes a part region of interest (herein supposed to have an index "i"), "j" denotes an index indicating a pixel inside the part region of interest "$p_i$", and "M" denotes the number of all pixels inside the part region of interest "$p_i$". Moreover, "$P_L(c)$" denotes a prior probability of the skin attribute "c", "$\phi'^L_{ij}$" denotes a skin attribute feature amount calculated on a pixel "j" inside the part region of interest "i", and "$P_L(\phi'^L_{ij} | c)$" denotes the likelihood of the skin attribute feature amount "$\phi'^L_{ij}$" relative to the skin attribute index "c". In the present exemplary embodiment, the following formula (10) is used as a discriminant function used for detection:

$$w_e \cdot \text{sigmoid}\left(\sum_{i=0}^{n} F_i \cdot \phi(H, p_i) + \sum_{i=1}^{n} \{a_i \cdot (x'_i, y'_i) + b_i \cdot (x'^2_i, y'^2_i)\}\right) + \quad (10)$$

$$w_e \cdot \frac{1}{n} \sum_{i=1}^{n} \max_c \rho'_i(c)$$

Here, "sigmoid(x)" in the first term is a sigmoid function expressed by the following formula (11):

$$\text{sigmoid}(x) = \frac{1}{1 + e^{-ax}} \quad (11)$$

Moreover, "$w_e$" and "$w_e$" are weight distribution coefficients that satisfy the following formula (12):

$$w_e + w_e = 1 \quad (12)$$

Thus, in formula (10), a value with a skin attribute taken into consideration (the first term) and a value with no skin attribute taken into consideration (the second term) are normalized, and a weighted sum of those are calculated. In this formula, a detection score is raised according to the degree of coincidence in skin attribute. Therefore, in a case where there is no influence of skin attributes or the influence of skin attributes is small, a detection score is calculated based on an HOG feature as in non-patent literature 1. In step S205, the candidate detection unit 122 detects, as a candidate, a part constituent in which the output value of the discriminant function expressed by formula (10) becomes a value equal to or greater than a predetermined threshold value. Generally, a plurality of part constituent candidates is detected for each part. Furthermore, although, in non-patent literature 1, non-maximum suppression (NMS) is performed on a plurality of part constituent candidates as detected, the present exemplary embodiment does not perform that processing, but uses the detected plurality of part constituent candidates at a later stage of processing.

Then, in step S206, the candidate detection unit 122 stores the part constituent candidate detected in step S205 into the storage unit 101. Then, in step S207, the candidate detection unit 122 increments the model index "k".

Next, in step S208, the high-reliability part selection unit 123 selects a high-reliability part. In the present exemplary embodiment, the high-reliability part selection unit 123 selects a high-reliability part by examining variations in position of a plurality of part constituent candidates detected in step S205 for each part constituting an object. More specifically, using a plurality of part constituent candidates detected for each model, the high-reliability part selection unit 123 calculates an average and a variance-covariance matrix of part positions of the parts. Then, the high-reliability part selection unit 123 selects, as a high-reliability part, a part in which a predetermined element value of the variance-covariance matrix is equal to or less than a predetermined threshold value (equal to or less than a first threshold value), and sets a part constituent candidate having the highest detection score of the plurality of part constituent candidates as a part region of the high-reliability part. The part position as used herein is the center of mass of the part region. Furthermore, various methods for detecting a high-reliability part can be considered. For example, a part having a part constituent candidate in which the detection score is equal to or greater than a predetermined threshold value (equal to or greater than a second threshold value) can be selected as a high-reliability part. Other methods for detecting a high-reliability part are described later below. Moreover, the candidate detection unit 122 selects parts other than high-reliability parts as non-high-reliability parts.

Next, in step S209 and step S210, the model restructuring unit 124 relocates the non-high-reliability parts by changing the positions of the non-high-reliability parts based on the high-reliability parts. With this processing, the model restructuring unit 124 restructures models for object detection. First, in step S209, the model restructuring unit 124 relocates the high-reliability parts selected in step S208 and the non-high-reliability parts.

Here, details of processing in step S209 performed by the model restructuring unit 124 are described with reference to FIG. 3. FIG. 3 is a flowchart illustrating processing for reallocating parts, which is performed by the model restructuring unit 124. First, in step S301, the model restructuring unit 124 prepares a coordinate space for reallocating parts as a relocation model space. Then, in step S302, the model restructuring unit 124 appends a part index "p" to a high-reliability part selected by the high-reliability part selection unit 123 in step S208 illustrated in FIG. 2.

Next, in step S303, the model restructuring unit 124 initializes the part index "p" to "0". Then, in step S304, the model restructuring unit 124 temporarily locates the high-reliability part (p=0) to the origin of the relocation model space. Then, in step S305, the model restructuring unit 124 increments the part index "p". In step S306, the model restructuring unit 124 checks whether all of the high-reliability parts have been temporarily located. If it is determined that not all of the high-reliability parts have been temporarily located (NO in step S306), the processing proceeds to step S307. If it is determined that all of the high-reliability parts have been temporarily located (YES in step S306), the processing proceeds to step S309.

In step S307, with respect to a high-reliability part (p>0), the model restructuring unit 124 calculates a difference vector between average positions of a high-reliability part (p=0) and a high-reliability part (p>0) calculated in step S208, and temporarily locates the high-reliability part (p>0) to a position in which the origin on the relocation model space is set to the starting point of the difference vector. In step S308, the model restructuring unit 124 increments the part index "p". Then, in step S309, the model restructuring unit 124 initializes the part index "p" to "0". In step S310, the model restructuring unit 124 checks whether all of the high-reliability parts have been processed. If it is determined that not all of the high-reliability parts have been processed (NO in step S310), the processing proceeds to step S311. If it is determined that all of the high-reliability parts have been processed (YES in step S310), the processing proceeds to step S313.

In step S311, the model restructuring unit 124 performs data collection for temporarily locating a non-high-reliability part, using the high-reliability part temporarily located in step S307. In the present exemplary embodiment, first, with respect to a high-reliability part "p", the model restructuring unit 124 prepares part constituent candidates (plural) used to select the high-reliability part "p" in step S208. Then, the model restructuring unit 124 examines part constituent candidates of the high-reliability part "p", identifies a high-reliability part "p" (i.e., a part constituent candidate having the highest detection score) and other part constituent candidates "p'", and examines the overlap rate between the high-reliability part "p" and each of the part constituent candidates "p'". Then, the model restructuring unit 124 extracts, as data collection targets, part constituent candidates "p'" the overlap rate of which is equal to or greater than a predetermined threshold value (equal to or greater than a fourth threshold value), including a high-reliability part "p" (i.e., a part constituent candidate having the highest detection score). Furthermore, in the present exemplary embodiment, the model restructuring unit 124 extracts, as data collection targets, part constituent candidates "p'" the overlap rate of which is equal to or greater than 0.5. Moreover, the model restructuring unit 124 uses the following formula (13) to calculate the overlap rate:

$$Ov = (R(p) \cap R(p'))/(R(p) \cup R(p')) \quad (13)$$

Here, "R(p)" denotes a part region of a high-reliability part "p" of interest, and "R(p')" denotes a part region of a part constituent candidate "p'" identified with respect to the high-reliability part "p" of interest. The symbol "∩" indicates a region in which the part regions "R(p)" and "R(p')" overlap, and the symbol "∪" indicates a region contained in at least one of the part regions "R(p)" and "R(p')".

Then, the model restructuring unit 124 calculates an average and a variance-covariance matrix of positions about the part constituent candidates extracted as data collection targets with respect to each of the non-high-reliability parts. Here, the model restructuring unit 124 calculates an average and a variance-covariance matrix of positions about the part constituent candidates extracted as data collection targets beginning with a high-reliability part closest to the root side of a non-high-reliability part of interest with respect to each non-high-reliability part.

In step S312, the model restructuring unit 124 increments the part index "p". In step S313, the model restructuring unit 124 temporarily locates the non-high-reliability parts. In the present exemplary embodiment, the model restructuring unit 124 temporarily locates each non-high-reliability part at an average position in which the maximum of element values of the variance-covariance matrix calculated in step S311 becomes minimum. Here, since, in a case where there is a plurality of models, part constituent candidates are extracted for each model, the same non-high-reliability part may be temporarily located at a plurality of positions. If the same non-high-reliability part is temporarily located at a plurality of positions, the model restructuring unit 124 selects a position in which the element value of the variance-covariance matrix is smallest and temporarily locates the non-high-reliability part at the selected position.

In step S314, the model restructuring unit 124 actually locates the parts temporarily located on the relocation model space. More specifically, first, the model restructuring unit 124 sets such a circumscribed rectangle as to contain the high-reliability part temporarily located in step S307 and the non-high-reliability parts temporarily located in step S313. Then, the model restructuring unit 124 moves the origin of the relocation model space to a vertex of the circumscribed rectangle both the x-coordinate and y-coordinate of which are minimum. The model restructuring unit 124 sets the coordinates of each part as actually located part coordinates. Then, the model restructuring unit 124 causes the actually located part coordinate system to accord with a coordinate system of the model read in step S202 as appropriate. The accordance of coordinate systems includes, for example, the conversion from pixel coordinates to model coordinates used for calculating an HOG feature amount. With the above-described processing, the relocation of parts in step S209 is performed.

Referring back to the flowchart of FIG. 2, in step S210, the model restructuring unit 124 re-sets model parameters based on the parts relocated in step S209. The model parameters to be re-set include weight vectors "$F_i$" of part models, a rectangle region "$p_i$", coefficients "$a_i$" and "$b_i$" of the cost function, and a two-dimensional vector "$v_i$" representing the relative positional relationship between the reference central coordinates of a root model and the reference central coordinates of a part model. The model restructuring unit 124 re-sets, as those values, values of a model from which the parts are extracted with respect to each high-reliability part or non-high-reliability part.

Finally, in step S211, the part detection unit 125, which serves as a second detection unit, using the models restructured in steps S209 and S210, detects a plurality of part constituent candidates, which constitute an object, in a similar way to that in step S205. Here, the part detection unit 125 takes a score calculated by the evaluation score calculator into consideration. Then, the part detection unit 125 performs non-maximum suppression (NMS) processing and detects the final positions of parts. Then, the detection processing according to the present exemplary embodiment ends.

Figure 8A:
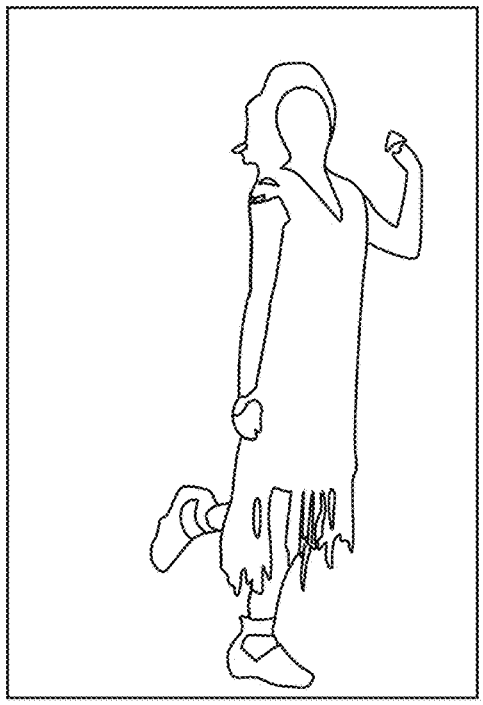
FIGS. 8A, 8B, 8C, and 8D illustrate a concept of detection processing for an object according to the first exemplary embodiment.
Figure 8B:
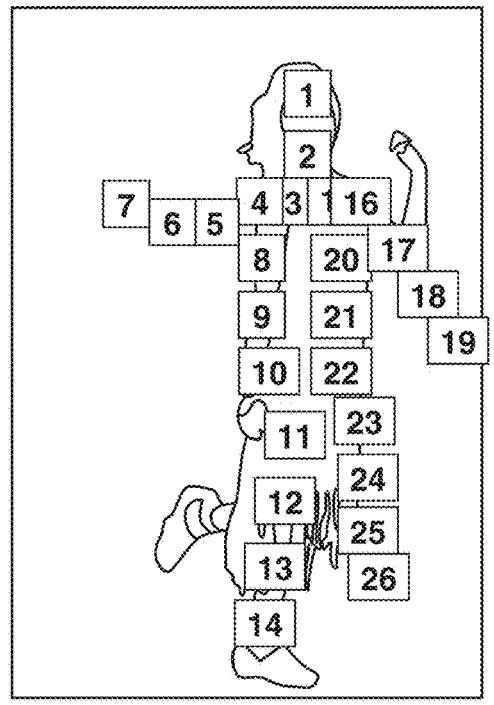

FIGS. 8A, 8B, 8C, and 8D illustrate a concept of detection processing for an object according to the above-described exemplary embodiment. FIG. 8A illustrates an example of a detection target image that the detection data acquisition unit 121 detects in step S201. The detection target image contains a target object (human body) to be detected, which is posing with the right leg up. Next, FIG. 8B illustrates part regions in rectangular form corresponding to part constituent candidates detected by the candidate detection unit 122 using the previously learned model, and a number written in each rectangle denotes a part index of each part. Although, as mentioned above, the candidate detection unit 122 generally detects a plurality of part constituent candidates with respect to each part, FIG. 8B illustrates only a part region of each part for the avoidance of complication of figures.

Figure 8C:
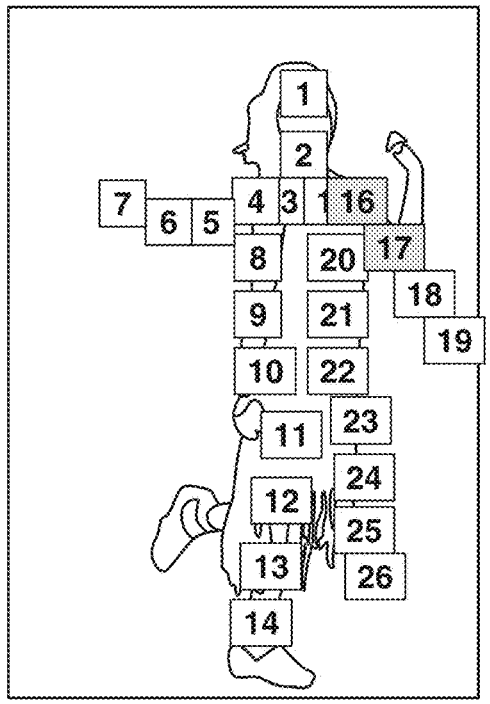

Next, FIG. 8C illustrates an example in which the high-reliability part selection unit 123 selects a high-reliability part based on variations in position of part constituent candidates detected for each part. Here, an example is illustrated in which parts indicated with indexes "p" of "16" and "17" are selected as high-reliability parts. Since, in the present exemplary embodiment, the detection score of a part constituent candidate is raised according to the degree of coincidence in skin attribute, such parts are likely to be selected as a high-reliability part. Here also, a region at which the skin of the left upper arm is viewable is selected as a high-reliability part.

Figure 8D:
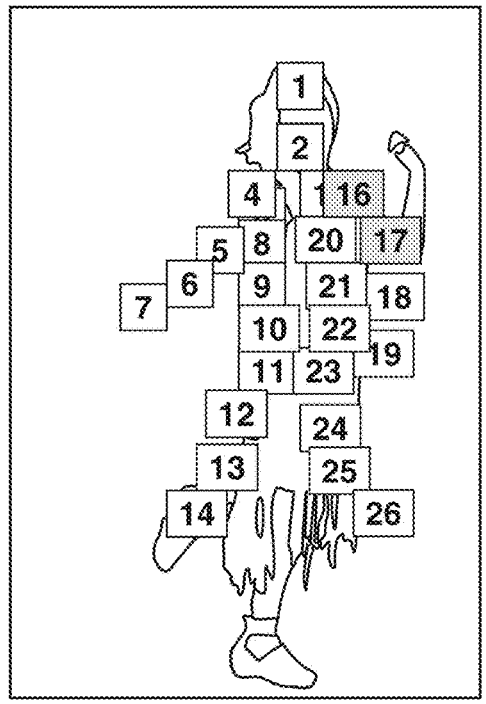

FIG. 8D illustrates a result obtained by the part detection unit 125 detecting the final positions of parts (regions) of the target object (human body) using the model restructured by the model restructuring unit 124. For example, in a case where there is only a few learned images of a person posing with one leg up, the positions of respective parts corresponding to both legs may not be accurately detected, as illustrated in FIG. 8B. On the other hand, according to the present exemplary embodiment, since a model is restructured based on a high-reliability part so as to detect the part positions, the positions of respective parts can be precisely detected as illustrated in FIG. 8D.

As described above, in the present exemplary embodiment, first, the learning unit 110 previously generates and learns one or more models. The detection unit 120 detects candidate regions (part constituent candidates) serving as candidates of parts of a target object (regions of the human body). Then, the detection unit 120 selects, as a high-reliability part (a first part), a part determined to have relatively high reliability in terms of an edge structure (HOG feature) or an evaluation of skin attribute from among the parts of the target object. More specifically, the detection unit 120 selects, as a high-reliability part, a part having less variation in position of candidates of a plurality of part regions detected based on an edge structure (HOG feature) or an evaluation score of skin attribute using one or more models for each part.

Then, the detection unit 120 relocates a non-high-reliability part (a second part) having relatively low reliability based on the high-reliability part. With this relocation, the detection unit 120 restructures a detection model used for detecting a target object. Finally, the detection unit 120 detects regions of human body parts in an image of the target object based on the restructured detection model, thus estimating the attitude of the human body. Accordingly, in the present exemplary embodiment, since the estimation accuracy is improved even in a posture that is not contained in the learned images, the positions of parts of the target object can be precisely detected.

(Modification Example in First Exemplary Embodiment)

Although, in the present exemplary embodiment, the image processing apparatus 100 is configured to include both the learning unit 110 and the detection unit 120, the learning unit 110 and the detection unit 120 can be configured as separate image processing apparatuses. However, in this case, both the learning unit 110 and the detection unit 120 need to be configured to be able to access the storage unit 101.

Furthermore, although, in the present exemplary embodiment, a vector composed of RGB values is used as a skin attribute feature amount, the skin attribute feature amount does not have to be composed of RGB values as long as it is able to express a skin attribute. For example, the skin attribute feature amount can be collected using values acquired from another color space, such as YCbCr or YUV. Alternatively, the skin attribute feature amount can be collected using information about other than color spaces, such as luminance information or infrared information.

Moreover, the present exemplary embodiment is configured to store the part constituent candidates detected in step S205 into the storage unit 101 in step S206. However, if the present exemplary embodiment is configured to be able to refer to the part constituent candidates detected in step S205 when performing processing at a subsequent stage, it is not necessary to store the detected part constituent candidates into the storage unit 101. For example, the present exemplary embodiment can be configured to retain the detected part constituent candidates on a memory.

Additionally, in the present exemplary embodiment, since, when a candidate of a part region is detected, the score is raised according to the degree of coincidence in skin attribute in formula (10), the selected high-reliability part is likely to be a region at which the skin is viewable. Therefore, the high-reliability part can be detected as a part at which the skin is viewable and, then, can be used for other processing.

Furthermore, although, in the present exemplary embodiment, the method set forth in non-patent literature 1 is used for the model learning unit 112 and the candidate detection unit 122 to perform processing, another conventional method can be used as long as it is an object detection method using a deformable part model. For example, a method discussed in non-patent literature 3 (Y. Yang and D. Ramanan, "Articulated pose estimation with flexible mixtures-of-parts", IEEE Conference on Computer Vision and Pattern Recognition (CVPR), 2011) can be used. Additionally, a tree structure is employed for part constituents in non-patent literature 3. Therefore, in step S313, some of non-high-reliability parts situated between high-reliability parts adjacent on part constituents of the tree structure can be temporarily located by using interpolation, such as linear interpolation. In a case where all of the non-high-reliability parts are temporarily located by using linear interpolation, processing in step S309 to step S312 can be omitted.

Moreover, in the above-mentioned step S208, the high-reliability part selection unit 123 selects a high-reliability part by detecting a part constituent candidate using an edge structure and a skin attribute as an index for evaluating the degree of certainty of each part and examining variations in position of part constituent candidates in each part. However, the method of selecting a high-reliability part can include various other methods. For example, the method can provide a unit that divides a detection target image into a plurality of segments and extracts a feature amount of each segment, and use segmentation information indicating the extracted feature amount as an evaluation index. For example, first, the method performs segmentation using a method discussed in non-patent literature 5 (R. Achanta, A. Shaji, K. Smith, A. Lucchi, P. Fua, S. Susstrunk, "SLIC Superpixels Compared to State-of-the-Art Superpixel Methods", IEEE Transactions on Pattern Analysis and Machine Intelligence, Vol. 34, No. 11, 2012), and calculates an RGB histogram as color features from segments overlapping parts and expresses the RGB histogram by vectors. Then, the method can calculate an average and a variance-covariance matrix of the vectors and, when a predetermined element value of the variance-covariance matrix in a part has become equal to or greater than a predetermined threshold value (a third threshold value), select the part as a high-reliability part.

Additionally, as another method, the method can use infrared information. For example, the method can determine that a part overlapping a region having a high infrared intensity overlaps a region in which the skin is viewable, and select the part as a high-reliability part.

Furthermore, as another method, the method can use a similarity in texture within a part region. For example, the method can convert a luminance pattern within a part region into vectors at various scales, calculate an average and a variance-covariance matrix of the vectors, and, when a predetermined element value of the variance-covariance matrix in a part has become equal to or greater than a predetermined threshold value, select the part as a high-reliability part. Alternatively, the method can calculate feature amounts expressing a texture with the use of existing technology, and select a high-reliability part based on the similarity between the feature amounts.

Moreover, as another method, the method can measure the observation probability of a predetermined evaluation index with respect to a specific region. With regard to a specific observation probability, in a case where, for example, associated part positions within a part constituent candidate are used as an evaluation index, first, the method sets a label number for each part. Then, the method sets respective label numbers to pixels within an internal region of each part with respect to each part constituent candidate detected in step S205. The method counts the number of times of setting of each label number with respect to every pixel, and extracts, as a region of a high-reliability part, pixels in which the ratio of the counted number to the number of part constituent candidates exceeds a predetermined threshold value. In a case where there is a plurality of regions of a specific high-reliability part, the method can employ the largest region.

Additionally, as another method, the method can measure voting values to each part with respect to a specific region. In a case where, for example, associated part positions within a part constituent candidate are used as an evaluation index, first, the method divides an image into grid rectangles of a predetermined size and sets label numbers for respective parts. Then, with respect to each grid rectangle in which each part overlaps each part constituent candidate detected in step S205, the method progressively votes (cumulates) the ratio of overlapping for the label number of the part. Finally, the method examines the cumulated voting value for each label number with respect to each grid rectangle, and, when the voting value has become maximum and equal to or greater than a predetermined threshold value in a grid rectangle, determines that the grid rectangle belongs to the part of the associated label number.

Furthermore, as another method, the method can measure the reliability of a predetermined evaluation index with respect to a specific region. For example, the method can set, as an evaluation index, a part position and a color feature, which is obtained by vectorizing an RGB histogram within a part region, and use, as the reliability of the evaluation index, the likelihood of a color feature for each part in addition to variations in the part position. In this case, the method previously learns generative models about color features for respective parts. Then, in step S208, first, the method generates a color feature from a part region for each part with respect to each part constituent candidate detected in step S205, and calculates the likelihood of a color feature using the generated color feature and the learned model. When a part in which the average of likelihoods is equal to or greater than a predetermined threshold value and a predetermined element value of the variance-covariance matrix calculated from the part position is equal to or less than a predetermined threshold value exists, the method selects the part as a high-reliability part.

Moreover, as another method, the method can set the relative distance between parts as an evaluation index, and select a high-reliability part by examining variations in the distance. For example, the method can calculate an average and a variance of the relative distances between parts, and, when the variance becomes equal to or less than a predetermined threshold value in a part, selects the part as a high-reliability part.

Additionally, as another method, the method can previously prepare a part detector for detecting a specific attitude of a specific part corresponding to, for example, the head or upper arm, and, when the output of the part detector is equal to or greater than a predetermined threshold value in a part, select the part as a high-reliability part. Details of this configuration are described below as a second exemplary embodiment. Furthermore, in a case where this configuration is employed, when locating non-high-reliability parts in step S209, with regard to parts that are in a bilaterally symmetric relationship with each other, the method can additionally temporarily locate a part obtained by reversing the right-left attribute of portions of a high-reliability part with respect to a symmetry axis between the high-reliability part and the non-high-reliability part. For example, in a case where a high-reliability part is temporarily located as a part corresponding to the right forearm region, the method can additionally temporarily locate the high-reliability part as a part corresponding to the left forearm region. With this processing, even in a case where a part is temporarily located with the wrong right-left attribute, the possibility of a correct model being restructured can be increased.

Furthermore, as another method, the method can select a high-reliability part based on the output value of a discriminant function from among part constituent candidates detected in step S205. For example, the method can generate a score distribution for each part about part constituent candidates detected in step S205, and select, as a high-reliability part, a part having a score the standard deviation "σ" of which in the score distribution is equal to or greater than 3 times and which is the largest value. Here, a score for each part can be defined, for example, as expressed in the following formula (14) along with formula (10). In formula (14), "i" denotes an index of a part of interest.

$$w_e \cdot \text{sigmoid}\,(F_i \cdot \phi(H,\, p_i) + \{a_i \cdot (x_i',\, y_i') + b_i \cdot (x_i'^2,\, y_i'^2)\}) + \qquad (14)$$

$$w_c \cdot \max_c \rho_i'(c)$$

Next, a second exemplary embodiment of the present invention is described. The above-described first exemplary embodiment is configured to select, as a high-reliability part, a part determined to have a low possibility of erroneous detection, based on a plurality of evaluation indices for each detected part. The second exemplary embodiment, which is described below, is configured to select a high-reliability part using a dedicated detector for detecting some parts. Furthermore, elements of the configuration of the second exemplary embodiment similar to those of the configuration of the first exemplary embodiment are assigned the respective same reference numerals, and the description thereof is not repeated.

FIG. 4 is a schematic block diagram illustrating an image processing apparatus 100 according to the second exemplary embodiment. Referring to FIG. 4, the image processing apparatus 100 of the second exemplary embodiment differs from that of the first exemplary embodiment in that a specific part detection unit 421 is additionally provided. Details of processing performed by the image processing apparatus 100 of the second exemplary embodiment are described with reference to FIG. 5.

Figure 5:
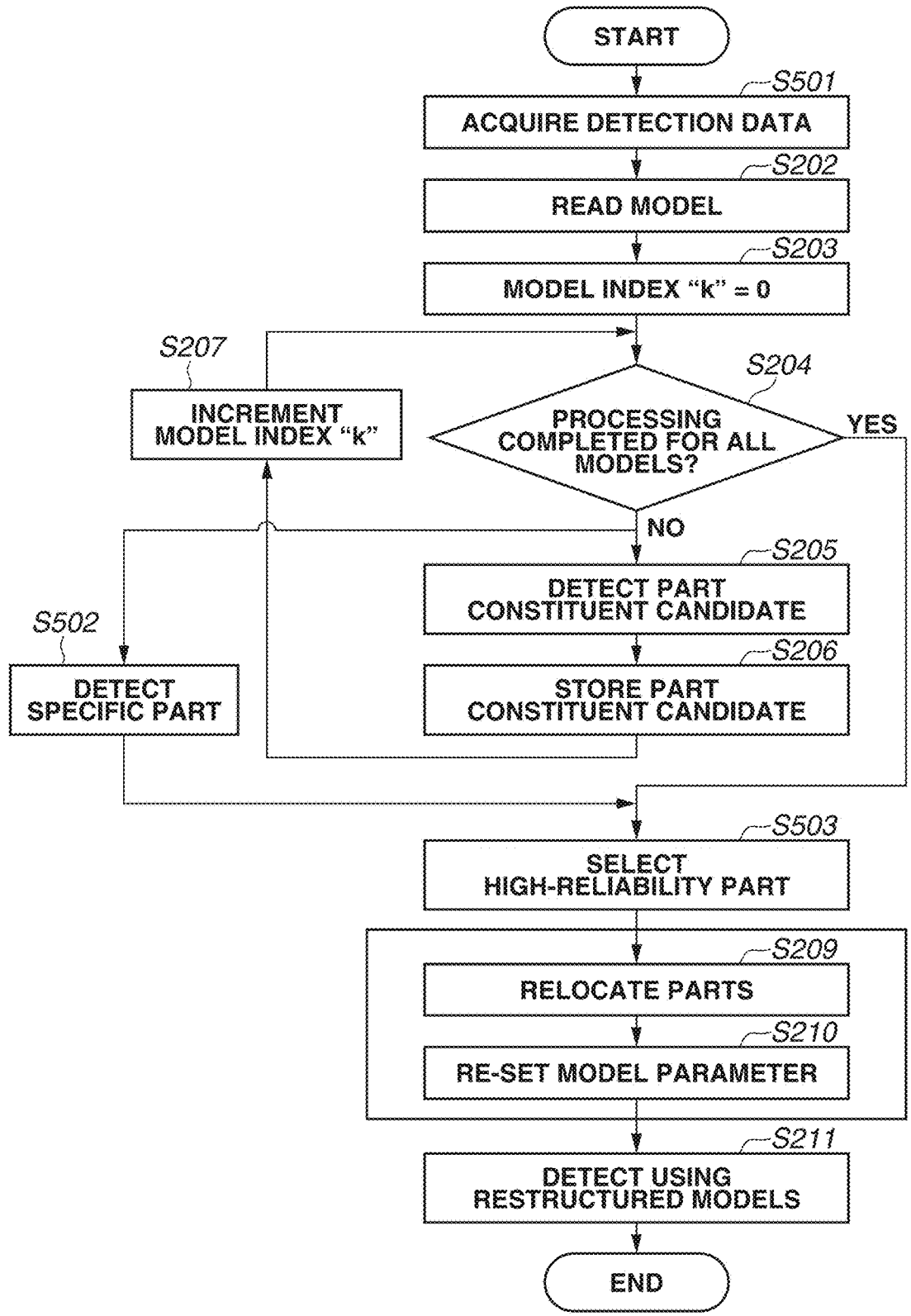
FIG. 5 is a flowchart illustrating detection processing for an object according to the second exemplary embodiment.

FIG. 5 is a flowchart illustrating processing for detecting an object according to the second exemplary embodiment. In step S501, the detection data acquisition unit 121 acquires a detection target image as in the first exemplary embodiment. Then, the detection data acquisition unit 121 passes the acquired detection target image to the specific part detection unit 421. Then, processing in step S202 and processing in subsequent steps, which are performed by the candidate detection unit 122, and processing in step S502, which is performed by the specific part detection unit 421, are performed in parallel. Here, although processing in step S502 is performed in parallel with processing in step S202 to before step S503, processing in step S502 can be performed after processing in step S202 to before step S503 is performed. Moreover, processing in step S202 to step S207 is the same processing as in the first exemplary embodiment.

In step S502, the specific part detection unit 421 detects a predetermined specific part using a dedicated detector. In the second exemplary embodiment, the specific part detection unit 421 detects a part corresponding to the face using an existing face detector. The face detector, which can employ various methods, uses, in the second exemplary embodiment, a method discussed in non-patent literature 4 (P. Viola and M. Jones, "Rapid object detection using a boosted cascade of simple features", CVPR, vol. 1, pp. 511-518, 2001).

Then, in step S503, the high-reliability part selection unit 123 selects, as a high-reliability part, a detection result having the highest reliability in step S502 as a part corresponding to the face. Moreover, the high-reliability part selection unit 123 further selects a high-reliability part in the same manner as in the first exemplary embodiment. The subsequent processing is similar to that in the first exemplary embodiment.

Furthermore, although, in the above description, the high-reliability part selection unit 123 is configured to select, as a high-reliability part, a detection result having the highest reliability from among detection results obtained in step S502, the high-reliability part selection unit 123 can use the detection results obtained in step S502 as a portion of the evaluation index. For example, the high-reliability part selection unit 123 can define a discriminant function in which the detection results obtained in step S502 are set as a portion of the evaluation index, as in step S205, and, when the output value of the discriminant function has become a predetermined threshold value in a part, select the part as a high-reliability part. For example, the following formula (15) can be used as the discriminant function:

$$w_e \cdot \text{sigmoid}\left(\sum_{i=0}^{n} F_i \cdot \phi(H, p_i) + \sum_{i=1}^{n} \{a_i \cdot (x'_i, y'_i) + b_i \cdot (x'^2_i, y'^2_i)\}\right) + \quad (15)$$

$$w_c \cdot \frac{1}{n}\sum_{i=1}^{n} \max_c \rho'_i(c) + w_f \cdot \text{sigmoid}(S(p_f))$$

Here, "$S(p_f)$" denotes a numerical value output as a detection result from the face detector in step S502, and "$p_f$" denotes a part region of interest (here, assumed to have an index "i") corresponding to a region output as the detection result. Moreover, the high-reliability part selection unit 123 uses the above formula (14) to select the part region of interest "$p_f$", and selects a part region having the highest overlap rate to overlap a region output by the face detector as a detection result. Additionally, "$w_e$", "$w_c$", and "$w_f$" denote weight distribution coefficients satisfying the following formula (16):

$$w_e + w_c + w_f = 1 \quad (16)$$

As described above, the second exemplary embodiment is configured to not only select a high-reliability part in the same manner as in the first exemplary embodiment but also use a dedicated detector to detect a predetermined specific part (in the case of the second exemplary embodiment, the face) and select the specific part as a high-reliability part. With this processing, a high-reliability part can be more accurately selected, and the part positions of an object can be precisely detected.

Next, a third exemplary embodiment of the present invention is described. The third exemplary embodiment is configured to take a constraint between parts into consideration when detecting a part constituent candidate, selecting a high-reliability part, or restructuring a model. Furthermore, elements of the configuration of the third exemplary embodiment similar to those described above in the first and second exemplary embodiments are assigned the respective same reference numerals, and the description thereof is not repeated.

The configuration of an image processing apparatus 100 according to the third exemplary embodiment is similar to that illustrated in FIGS. 1A and 1B described in the first exemplary embodiment, and, therefore, the description thereof is not repeated. However, the learning processing performed by the learning unit 110 is different from that in the first exemplary embodiment. The model learning unit 112 in the third exemplary embodiment not only performs learning described in the first exemplary embodiment but also calculates co-occurrence between parts. In the third exemplary embodiment, the model learning unit 112 uses the method set forth in non-patent literature 3 to calculate the co-occurrence. More specifically, the model learning unit 112 introduces a type "$t_i \in \{1, \ldots, T\}$" indicating the angle of a part, and calculates "$b_i^{ti}$" and "$b_{ij}^{ti,tj}$" in the following formula (17) expressing a score regarding co-occurrence in angle between adjacent parts "i" and "j":

$$S(t) = \sum_{i \in V} b_i^{ti} + \sum_{ij \in E} b_{ij}^{ti,tj} \quad (17)$$

Here, "$b_i^{ti}$" denotes a numerical value indicating a degree at which the part "i" becomes the type "$t_i$", and "$b_{ij}^{ti,tj}$" denotes a numerical value indicating a degree at which the part "i" becomes the type "$t_i$" and the part "j" becomes the type "$t_j$". Furthermore, "V" and "E" denote values corresponding to a node (V) and an edge (E) of a graph, respectively, when a part structure is regarded as a graph structure. The values "$b_i^{ti}$" and "$b_{ij}^{ti,tj}$" are statistically calculated from type information given as positive example region-of-interest information, which is acquired by the learning data acquisition unit 111 of the learning unit 110. The output unit 113 stores, into the storage unit 101, the model learned by the model learning unit 112 in the same manner as in the first exemplary embodiment and the values "$b_i^{ti}$" and "$b_{ij}^{ti,tj}$" calculated in the above-described way.

Figure 6:
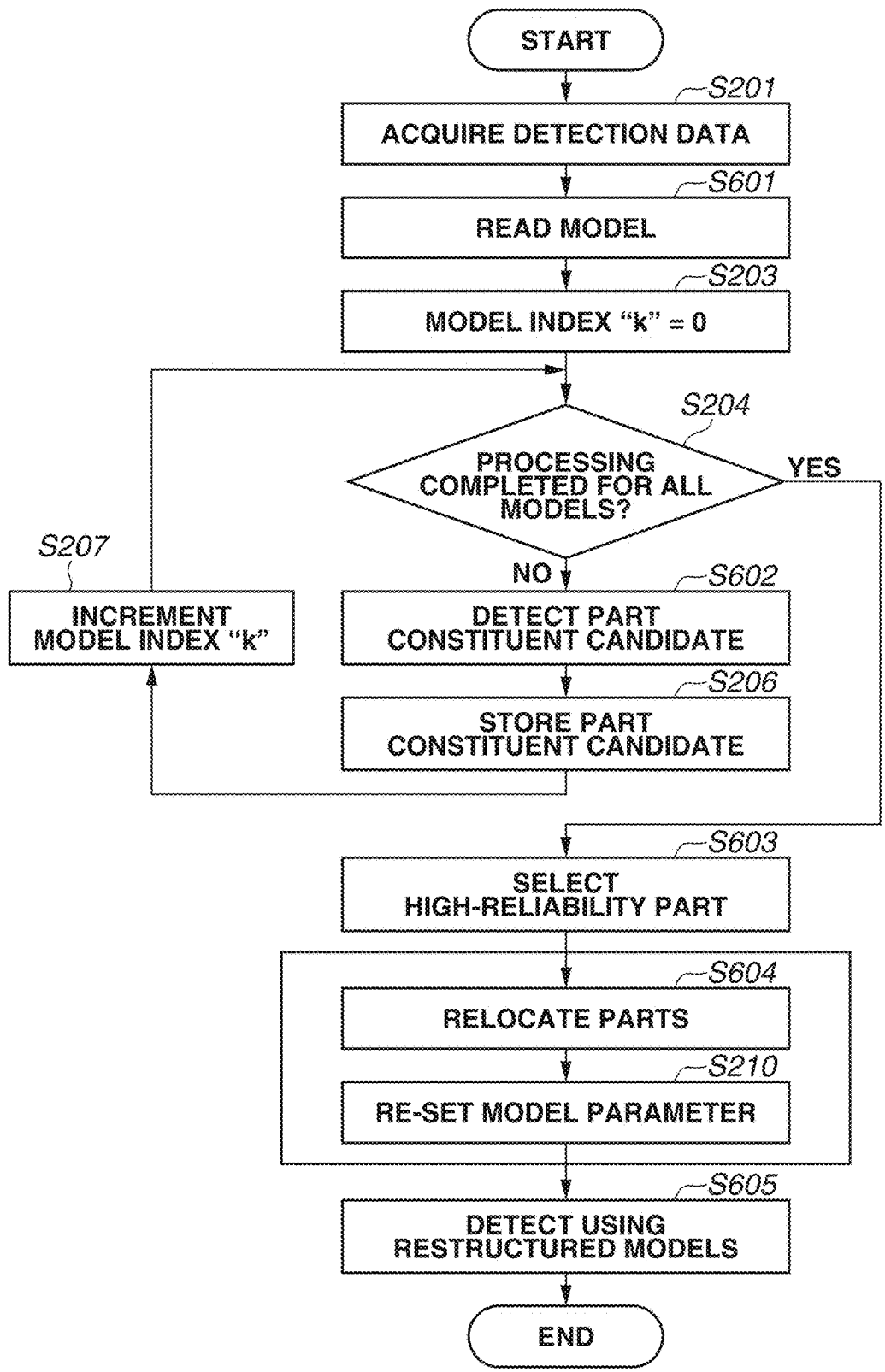
FIG. 6 is a flowchart illustrating detection processing for an object according to a third exemplary embodiment.

Next, details of processing performed by the detection unit 120 of the image processing apparatus 100 are described with reference to FIG. 6. FIG. 6 is a flowchart illustrating processing for detecting an object according to the third exemplary embodiment. Steps with the same step numbers in FIG. 6 as those in the first exemplary embodiment illustrated in FIG. 2 indicate the same processing as in the first exemplary embodiment, and, therefore, the description thereof is not repeated. In the detection processing in the third exemplary embodiment, in step S601, the detection data acquisition unit 121 reads and acquires one or more models and the values "$b_i^{ti}$" and "$b_{ij}^{ti,tj}$", which are stored in the storage unit 101.

Although processing in step S602 is almost the same as processing in step S205 in the first exemplary embodiment, in the case of the third exemplary embodiment, the candidate detection unit 122 adds co-occurrence between parts as an evaluation index. In other words, the candidate detection unit 122 uses the following formula (18) as a discriminant function for detection:

$$w_e \cdot \text{sigmoid}\left(\sum_{i=0}^{n} F_i \cdot \phi(H, p_i) + \sum_{i=1}^{n} \{a_i \cdot (x'_i, y'_i) + b_i \cdot (x'^2_i, y'^2_i)\}\right) + \quad (18)$$

$$w_c \cdot \frac{1}{n}\sum_{i=1}^{n} \max_c \rho'_i(c) + w_t \cdot \text{sigmoid}\left(\sum_{i \in V} b_i^{ti} + \sum_{ij \in E} b_{ij}^{ti,tj}\right)$$

Then, in step S603, the high-reliability part selection unit 123 selects a high-reliability part. Although processing in step S603 is almost the same as processing in step S208 in the first exemplary embodiment, the high-reliability part selection unit 123 also takes, into consideration, co-occurrence between parts as an evaluation value. More specifically, the high-reliability part selection unit 123 votes combinations of the type "$t_i$" of the part "i" and the type "$t_j$" of the part "j", which are adjacent parts, and calculates the vote probability with respect to each combination. Then, when a predetermined element value of the variance-covariance matrix of adjacent parts has become equal to or less than a predetermined threshold value and the vote probability has become equal to or greater than a predetermined threshold value, the high-reliability part selection unit 123 selects each of the adjacent parts as a high-reliability part.

Then, in step S604 and step S210, the model restructuring unit 124 restructures a model for object detection. Processing in step S604 is almost the same as processing in step S209 in the first exemplary embodiment, but differs from that in the first exemplary embodiment in the following point. In step S209 in the first exemplary embodiment, in a case where the same non-high-reliability part is temporarily located at a plurality of positions, the model restructuring unit 124 performs processing for selecting temporary location of the non-high-reliability part in such a way that the element value of the variance-covariance matrix becomes the smallest. On the other hand, in step S604 in the third exemplary embodiment, in a case where the same non-high-reliability part is temporarily located at a plurality of positions, the model restructuring unit 124 selects temporary location of the non-high-reliability part in such a way that the sum of co-occurrences between adjacent parts becomes the largest.

In step S605, the part detection unit 125 detects a plurality of part constituent candidates constituting an object in the same manner as in step S602, using a model restructured in step S604 and step S210. However, in the third exemplary embodiment, the part detection unit 125 not only takes a score calculated by the evaluation score calculator into consideration but also performs non-maximum suppression (NMS) processing. Through the above processing, the detection processing in the third exemplary embodiment is completed.

Furthermore, although, in the above description, co-occurrence is taken into consideration in all of processing operations performed by the candidate detection unit 122, the high-reliability part selection unit 123, and the model restructuring unit 124, co-occurrence can be taken into consideration in processing operations performed by only some of the functional units. Moreover, although, in the third exemplary embodiment, the method using co-occurrence is employed as a method of taking a constraint between parts into consideration, the constraint between parts can be taken into consideration in another method. Additionally, the method of expressing co-occurrence between parts is not limited to the method set forth in non-patent literature 3, but can be another method of expressing co-occurrence.

As described above, in the third exemplary embodiment, since a constraint between parts is taken into consideration in detection of a part constituent candidate, selection of a high-reliability part, or restructuring of a model, the part positions of an object can be precisely detected.

Next, a fourth exemplary embodiment of the present invention is described. The fourth exemplary embodiment is configured to restructure a model by iteratively selecting a high-reliability part. Furthermore, elements of the configuration of the fourth exemplary embodiment similar to those described above in the first to third exemplary embodiments are assigned the respective same reference numerals, and the description thereof is not repeated.

The schematic block diagram of an image processing apparatus 100 according to the fourth exemplary embodiment is similar to that in the first exemplary embodiment illustrated in FIGS. 1A and 1B, and, therefore, the description thereof is not repeated. Here, detection processing performed by the image processing apparatus 100 according to the fourth exemplary embodiment is described with reference to FIG. 7. FIG. 7 is a flowchart illustrating processing for detecting an object according to the fourth exemplary embodiment. Steps with the same step numbers in FIG. 7 as those in the first exemplary embodiment illustrated in FIG. 2 indicate the same processing as in the first exemplary embodiment, and, therefore, the description thereof is not repeated.

In step S701, the high-reliability part selection unit 123 selects a high-reliability part. The fourth exemplary embodiment differs from the first exemplary embodiment in that the high-reliability part selection unit 123 performs selection again as to whether a part other than parts determined to be a high-reliability part is a high-reliability part. The method of selecting a high-reliability part is similar to that described in the first exemplary embodiment.

Then, in step S702, the model restructuring unit 124 determines whether there is a difference between the high-reliability part newly selected in step S701 and the high-reliability part previously selected. If it is determined that there is a difference (YES in step S702), the processing proceeds to step S209. If it is determined that there is no difference (NO in step S702), the processing proceeds to step S211.

Processing in step S703 is almost the same as processing in step S210 in the first exemplary embodiment, in which the model restructuring unit 124 re-sets model parameters in the same manner as in the first exemplary embodiment. The fourth exemplary embodiment differs from the first exemplary embodiment in that, after re-setting of the model parameters is completed, the processing proceeds to step S203.

Finally, in step S211, the part detection unit 125, using the models restructured in steps S209 and S703, detects a plurality of part constituent candidates, which constitute an object, in a similar way to that in the first exemplary embodiment.

Furthermore, in the fourth exemplary embodiment, the high-reliability part selection unit 123 is configured to perform selection again as to whether a part other than parts determined to be a high-reliability part is a high-reliability part. However, the high-reliability part selection unit 123 can be configured to perform selection again on all of the parts as to whether a target part is a high-reliability part regardless of whether the target part has already been selected as a high-reliability part.

As describe above, in the fourth exemplary embodiment, since a model is restructured by iteratively selecting a high-reliability part until a difference between the selected high-reliability parts becomes equal to or less than a predetermined value, the part positions of an object can be precisely detected.

According to the above-described configurations of exemplary embodiments, the part positions of an object can be precisely detected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-135680 filed Jul. 6, 2015, which is hereby incorporated by reference herein in its entirety.

What is claimed is:

1. An image processing apparatus comprising:
one or more processors; and
a memory storing instructions that, when executed by the one or more processors, cause the image processing apparatus to perform operations including:
acquiring an image that includes a target object having a posture and a plurality of parts in an attitude relationship to each other, and acquiring a previously learned model,
detecting, as a first detection using the previously learned model, a candidate region of each of the plurality of parts of the target object included in the acquired image,
selecting, from among the plurality of parts and based on the candidate region detected by the first detection, a first part having a first reliability that is high and a second part having a second reliability that is low relative to the high first reliability, and
correcting the previously learned model by changing a position of the low reliability second part based on the selected first part having the high reliability,
wherein, after correcting the previously learned model, positions of the plurality of parts of the target object are detected using the corrected previously learned model, even in a case where a partial region cannot be sufficiently selected from the uncorrected previously learned model.

2. The image processing apparatus according to claim 1, wherein executing the instructions further include detecting, as a second detection, the positions of the plurality of parts using the corrected previously learned model.

3. The image processing apparatus according to claim 1, wherein selecting includes calculating a variance-covariance matrix of the candidate region detected for each of the plurality of parts, and selects, as the first part, a part in which a predetermined element value of the variance-covariance matrix is equal to or less than a first threshold value.

4. The image processing apparatus according to claim 1, wherein the first detection calculates a score indicating a degree of certainty of the candidate region, and
wherein selecting includes selecting, as the first part, a part including a candidate region the score of which is equal to or greater than a second threshold value.

5. The image processing apparatus according to claim 1, wherein selecting includes selecting the first part and the second part based on a variation in position of the candidate region detected for each of the plurality of parts.

6. The image processing apparatus according to claim 1, wherein selecting includes extracting configured to divide the image into a plurality of segments and extracting a feature amount of each of the plurality of segments,
wherein selecting includes selecting, as the first part, a part in which a predetermined element value of a variance-covariance matrix of the extracted feature amount is equal to or greater than a third threshold value.

7. The image processing apparatus according to claim 6, wherein extracting includes extracting a red, green, blue (RGB) histogram as the feature amount.

8. The image processing apparatus according to claim 1, wherein correcting includes changing the position of the second part based on an average and a variance-covariance matrix of positions relative to a predetermined candidate region from among the candidate regions detected for the first part.

9. The image processing apparatus according to claim 8, wherein the first detection calculates a score indicating a degree of certainty of the candidate region, and
wherein the predetermined candidate region includes a first candidate region the score of which is highest and a second candidate region an overlap rate of which with the first candidate region is equal to or greater than a fourth threshold value from among the candidate regions detected for the first part.

10. The image processing apparatus according to claim 1, wherein correcting includes changing the position of the second part by performing interpolation based on the first part.

11. The image processing apparatus according to claim 1, wherein, when the second part is in a bilaterally symmetric relationship with the first part, correcting includes changing the position of the second part by reversing the first part with respect to a symmetry axis between the first part and the second part.

12. The image processing apparatus according to claim 1, wherein the first detection detects, using a detector configured to detect a region of a specific part, a region of the specific part, and
wherein selecting includes selecting, as the first part, the specific part detected using the detector.

13. The image processing apparatus according to claim 12, wherein the specific part is a human face.

14. The image processing apparatus according to claim 1, wherein at least one of the first detection, selecting, and correcting performs processing based on a constraint in the plurality of parts.

15. The image processing apparatus according to claim 14, wherein the constraint in the plurality of parts is a constraint caused by co-occurrence between the parts.

16. The image processing apparatus according to claim 1, wherein the first detection, selecting, and correcting iterate processing until a difference between a number of the first parts previously selected by the selecting and a number of the first parts currently selected by the selecting becomes equal to or less than a predetermined number.

17. The image processing apparatus according to claim 1, wherein the target object is a multijoint object having one or more connection points, and each of the plurality of parts exists between the connection points adjacent to each other.

18. The image processing apparatus according to claim 1, wherein the target object is a human body, and each of the plurality of parts is a region of the human body.

19. A method for an image processing apparatus, the method comprising:
acquiring an image that includes a target object having a posture and a plurality of parts in an attitude relationship to each other, and acquiring a previously learned model;

detecting, as a first detection using the previously learned model, a candidate region of each of the plurality of parts of the target object included in the acquired image;

selecting, from among the plurality of parts and based on the candidate region detected by the first detection, a first part having a first reliability that is high and a second part having a second reliability that is low relative to the high first reliability; and correcting the previously learned model by changing a position of the low reliability second part based on the selected first part having the high reliability, wherein, after correcting the previously learned model, positions of the plurality of parts of the target object are detected using the corrected previously learned model, even in a case where a partial region cannot be sufficiently selected from the uncorrected previously learned model.

20. A non-transitory computer-readable storage medium storing computer-executable instructions that, when executed by a computer, cause the computer to perform a method for an image processing apparatus, the method comprising:

acquiring an image that includes a target object having a posture and a plurality of parts in an attitude relationship to each other, and acquiring a previously learned model;

detecting, as a first detection using the previously learned model, a candidate region of each of the plurality of parts of the target object included in the acquired image;

selecting, from among the plurality of parts and based on the candidate region detected by the first detection, a first part having a first reliability that is high and a second part having a second reliability that is low relative to the high first reliability; and correcting the previously learned model by changing a position of the low reliability second part based on the selected first part having the high reliability, wherein, after correcting the previously learned model, positions of the plurality of parts of the target object are detected using the corrected previously learned model, even in a case where a partial region cannot be sufficiently selected from the uncorrected previously learned model.

* * * * *